United States Patent [19]
Qin et al.

[11] Patent Number: 5,748,467
[45] Date of Patent: May 5, 1998

[54] METHOD OF ADAPTING AND APPLYING CONTROL PARAMETERS IN NON-LINEAR PROCESS CONTROLLERS

[75] Inventors: S. Joe Qin; Michael G. Ott, both of Austin; Wilhelm K. Wojsznis, Round Rock, all of Tex.

[73] Assignee: Fisher-Rosemont Systems, Inc., Austin, Tex.

[21] Appl. No.: 391,717

[22] Filed: Feb. 21, 1995

[51] Int. Cl.$^6$ .................................................. G05B 13/02
[52] U.S. Cl. ........................... 364/148; 364/161; 364/162; 364/157; 395/900
[58] Field of Search .................................. 364/148, 150, 364/152–155, 157–163, 165, 166, 177, 180, 181; 395/61, 900, 903–907; 318/561, 609, 610

[56] References Cited

U.S. PATENT DOCUMENTS

| | | | |
|---|---|---|---|
| 3,798,426 | 3/1974 | Bristol, II | 235/151.1 |
| 4,441,151 | 4/1984 | Hayashibe | 364/157 |
| 4,481,567 | 11/1984 | Kaya et al. | 364/157 |
| 4,549,123 | 10/1985 | Hägglund et al. | 318/610 |
| 4,602,326 | 7/1986 | Kraus | 364/158 |
| 4,698,756 | 10/1987 | Gonzalez et al. | 364/557 |
| 4,754,391 | 6/1988 | Suzuki | 364/157 |
| 4,758,943 | 7/1988 | Aström et al. | 364/157 |
| 4,768,143 | 8/1988 | Lane et al. | 364/157 |
| 4,792,911 | 12/1988 | Gonzalez et al. | 364/551.02 |
| 4,814,968 | 3/1989 | Fukumoto | 364/150 |
| 4,837,725 | 6/1989 | Yamakawa | 364/807 |
| 4,841,815 | 6/1989 | Takahashi | 74/866 |
| 4,842,342 | 6/1989 | Takahashi et al. | 303/102 |
| 4,855,674 | 8/1989 | Murate et al. | 324/158 R |
| 4,864,490 | 9/1989 | Nomoto et al. | 364/157 |
| 4,872,763 | 10/1989 | Higuchi et al. | 366/160 |
| 4,880,142 | 11/1989 | Higuchi et al. | 222/56 |
| 4,882,526 | 11/1989 | Iino et al. | 318/561 |
| 4,910,684 | 3/1990 | Ostergaard et al. | 364/503 |

(List continued on next page.)

FOREIGN PATENT DOCUMENTS

| | | | |
|---|---|---|---|
| 0 241 286 A1 | 10/1987 | European Pat. Off. | G05B 13/02 |
| 2 211 324 A | 6/1989 | United Kingdom | G06F 15/20 |
| WO 95/04956 | 2/1995 | WIPO | G05B 13/02 |

OTHER PUBLICATIONS

Åström and Hägglund, "A Frequency Domain Method for Automatic Tunning of Simple Feedback Loops," *Proceedings of 23rd Conference on Decision and Control*, pp. 299–304 (Dec. 1984).

Åström and Hägglund, "Automatic Tuning of Simple Regulators with Specifications on Phase and Amplitude Margins," *Automatica*, 20 (5), pp. 645–651 (1984).

Åström and Hägglund, "Practical Experiences of Adaptive Techniques," Proceedings of the ACC 90, pp. 1599–1606 (1990).

Boll et al., "Analyse von Fuzzy-Reglern in der Zustandsebene (Analysis of Fuzzy Controllers Using the State Plane)," *AT Automatisierungstechnik*, 41(5), pp. 145–151 (May 1993).

(List continued on next page.)

*Primary Examiner*—Reba I. Elmore
*Assistant Examiner*—Steven R. Garland
*Attorney, Agent, or Firm*—Marshall, O'Toole, Gerstein, Murray & Borun

[57] ABSTRACT

A non-linear process controller drives a process variable to be substantially equivalent to a set point based on the expected load disturbances within the process and on a measurement of the actual magnitude of set point changes. The controller uses control parameters developed in an optimal manner to control the process in response to expected load disturbances when no set point change has occurred. Whenever a set point change is detected, the controller derives a set of set point change control parameters and uses these set point change control parameters in responding to the set point change. Each of the set point change control parameters may be developed as a function of the magnitude of the actual change in the set point and according to a set of process characteristics which may include the time delay and the dominant time constant of the process.

41 Claims, 8 Drawing Sheets

U.S. PATENT DOCUMENTS

| | | | |
|---|---|---|---|
| 4,914,924 | 4/1990 | Takahashi | 62/133 |
| 4,930,084 | 5/1990 | Hosaka et al. | 364/426.04 |
| 4,939,648 | 7/1990 | O'Neill et al. | 364/422 |
| 4,954,975 | 9/1990 | Kalata | 364/567 |
| 4,959,767 | 9/1990 | Buchner et al. | 364/151 |
| 4,961,225 | 10/1990 | Hisano | 380/28 |
| 4,976,377 | 12/1990 | Higuchi et al. | 222/55 |
| 4,984,174 | 1/1991 | Yasunobu et al. | 364/513 |
| 4,985,824 | 1/1991 | Husseiny et al. | 364/187 |
| 5,001,640 | 3/1991 | Matsumoto et al. | 364/426.02 |
| 5,012,430 | 4/1991 | Sakurai | 364/513 |
| 5,016,188 | 5/1991 | Lan | 364/513 |
| 5,025,499 | 6/1991 | Inoue et al. | 364/165 |
| 5,029,314 | 7/1991 | Katsumi et al. | 355/208 |
| 5,043,862 | 8/1991 | Takahashi et al. | 364/162 |
| 5,051,932 | 9/1991 | Inoue et al. | 364/550 |
| 5,057,993 | 10/1991 | Kanda | 364/162 |
| 5,063,901 | 11/1991 | Kaneyasu et al. | 123/419 |
| 5,073,867 | 12/1991 | Murphy et al. | 395/27 |
| 5,083,447 | 1/1992 | Kiuchi et al. | 68/12.05 |
| 5,084,754 | 1/1992 | Tomitaka | 358/209 |
| 5,089,978 | 2/1992 | Lipner et al. | 364/551.01 |
| 5,091,844 | 2/1992 | Waltz | 364/153 |
| 5,101,366 | 3/1992 | Cueman et al. | 364/550 |
| 5,113,366 | 5/1992 | Yamakawa | 395/3 |
| 5,121,467 | 6/1992 | Skeirik | 395/11 |
| 5,127,063 | 6/1992 | Nishiya et al. | 382/8 |
| 5,129,379 | 7/1992 | Kaneyasu et al. | 123/436 |
| 5,131,074 | 7/1992 | Nakamura et al. | 395/61 |
| 5,134,867 | 8/1992 | Kiuchi et al. | 68/12.02 |
| 5,136,861 | 8/1992 | Kiuchi et al. | 68/12.04 |
| 5,138,846 | 8/1992 | Ogawa et al. | 62/148 |
| 5,140,842 | 8/1992 | Kiuchi et al. | 68/12.02 |
| 5,153,807 | 10/1992 | Saito et al. | 364/165 |
| 5,158,024 | 10/1992 | Tanaka et al. | 110/186 |
| 5,159,547 | 10/1992 | Chand | 364/157 |
| 5,161,110 | 11/1992 | Dorchak | 364/468 |
| 5,163,530 | 11/1992 | Nakamura et al. | 180/197 |
| 5,165,595 | 11/1992 | Horio et al. | 236/49.3 |
| 5,170,341 | 12/1992 | Sklaroff | 364/162 |
| 5,170,357 | 12/1992 | Sasaki et al. | 364/471 |
| 5,170,935 | 12/1992 | Federspiel et al. | 236/446 |
| 5,175,795 | 12/1992 | Tsuda et al. | 395/3 |
| 5,175,797 | 12/1992 | Funabashi et al. | 395/22 |
| 5,179,625 | 1/1993 | Hisano | 395/3 |
| 5,179,634 | 1/1993 | Matsunaga et al. | 395/75 |
| 5,193,144 | 3/1993 | Tsutsumi et al. | 395/76 |
| 5,200,905 | 4/1993 | Uemoto et al. | 364/474.04 |
| 5,206,566 | 4/1993 | Yoshida et al. | 318/568.22 |
| 5,231,335 | 7/1993 | Mega et al. | 318/85 |
| 5,241,651 | 8/1993 | Ueda | 395/61 |
| 5,245,695 | 9/1993 | Basehore | 395/900 |
| 5,268,835 | 12/1993 | Miyagaki et al. | 364/151 |
| 5,272,621 | 12/1993 | Aoki | 364/165 |
| 5,283,729 | 2/1994 | Lloyd | 364/157 |
| 5,287,432 | 2/1994 | Tomitaka | 395/61 |
| 5,295,061 | 3/1994 | Katayama et al. | 364/157 |
| 5,355,305 | 10/1994 | Seem et al. | 364/161 |

OTHER PUBLICATIONS

Boscolo and Drius, "Computer Aided Tuning and Validation of Fuzzy Systems," *IEEE Int'l Conf. on Fuzzy Systems*, pp. 605–614 (Mar. 1992).

Burkhardt and Bonissone, "Automated Fuzzy Knowledge Base Generation and Tuning," *IEEE Int'l Conf. on Fuzzy Systems*, pp. 179–188 (Mar. 1992).

Chen et al., "A Self–Learning Fuzzy Controller," *IEEE Int'l Conf. on Fuzzy Systems*, pp. 189–196 (Mar. 1992).

Daugherity et al., "Performance Evaluation of a Self–Tuning Fuzzy Controller," *IEEE Int'l Conf. on Fuzzy Systems*, pp. 389–397 (Mar. 1992).

Ender, "Troubleshooting Your PID Control Loop," Intech, pp. 35–38 (May 1992).

Hägglund and Åström, "A Frequency Domain Approach to Adaptive Control," *IFAC 11th Triennial World Congress*, six pages (1990).

Han and McMurray, "Two–Layer Multiple–Variable Fuzzy Logic Controller," *IEEE Transactions on Systems, Man, and Cybernetics*, 23(1), pp. 277–285 (Jan./Feb. 1993).

He et al., "Fuzzy Self–Tuning of PID Controllers," *Fuzzy Sets and Systems*, 56(1), pp. 37–46 (May 1993).

Hong et al., "A Design of Auto–Tuning PID Controller Using Fuzzy Logic," Int'l Conf. on Industrial Electronics, Control, Instrumentation and Automation, vol. 2, pp. 971–976 (Nov. 1992).

Jang, "Self–Learning Fuzzy Controllers Based on Temporal Back Propagation," *IEEE Transactions on Neural Networks*, 3(5), pp. 714–723 (Sep. 1992).

Kang and Vachtsevanos, "Adaptive Fuzzy Logic Control," *IEEE Int'l Conf. on Fuzzy Systems*, pp. 407–414 (Mar. 1992).

Karr and Gentry, "Fuzzy Control of pH Using Genetic Algorithms," *IEEE Transactions on Fuzzy Systems*, 1(1), pp. 46–53 (Feb. 1993).

Kaya and Scheib, "Tuning of PID Controls of Different Structures," *Control Engineering*, pp. 62–66 (Jul. 1988).

Lee, "Fuzzy Logic in Control Systems: Fuzzy Logic Controller" (Parts I and II), *IEEE Transactions on Systems, Man, and Cybernetics*, 20(2), pp. 404–435 (Mar./Apr. 1990).

Lin and Lee, "Neural–Network–Based Fuzzy Logic Control and Decision System," *IEEE Transactions on Computers*, 40(12), pp. 1320–1336 (Dec. 1991).

Ling and Edgar, "A New Fuzzy Gain Scheduling Algorithm for Process Control," Proceedings of ACC '92, pp. 2284–2290 (1992).

Ling and Edgar, "The Tuning of Fuzzy Heuristic Controllers," *AIChE Conference*, pp. 1–20 (Nov. 1992).

Linkens and Abbod, "Supervisory Hierarchical Intelligent Control For Medical And Industrial Systems," *ISA Conference and Exhibition on Industrial Automation*, pp. 1.21–1.24 (Jun. 1992).

Linkens and Abbod, "Supervisory Intelligent Control Using a Fuzzy Logic, pp. Hierarchy," *Transactions of the Institute of Measurement and Control*, 15(3), pp. 112–132 (1993).

Linkens and Shieh, "Self–Organizing Fuzzy Modelling for Nonlinear System Control," *Proceedings of the 1992 IEEE Int'l Symposium on Intelligent Control*, pp. 210–215 (Aug. 1992).

McAvoy, "Time Optimal and Ziegler–Nichols Control," *Ind. Eng. Chem. Process Des. Develop.*, 11(1), pp. 71–78 (1972).

McMillan et al., "Easy Tuner for DCS," *Advances in Instrumentation and Control*, 48(2), pp. 703–710 (1993).

Mizumoto, "Realization of PID Controls by Fuzzy Control Methods," *IEEE Int'l Conf. on Fuzzy Systems*, pp. 709–715 (Mar. 1992).

Myron, "Self–Tunning PID Control–An Expert System Approach," IFAC *Automatic Control in Petroleum, Petrochemical and Desalination Industries*, pp. 77–80 (1986).

Qin, "Auto–Tuned Fuzzy Logic Control," *1994 American Control Conference*, pp. 2465–2469 (Jun. 1994).

Qin and Borders, "A Multiregion Fuzzy Logic Controller for Nonlinear Process Control," *IEEE Transactions On Fuzzy Systems*, 2(1), pp.74–81 (Feb. 1994).

Radke, "Microprocessor–based Adaptive PID–Controllers," *ISA Transactions*, 27(2), pp. 43–50 (1988).

Schreiber and Zinser, "Automatisierungskonzepte mit Fuzzy Control und klassischer Regelungstechnik (Automation Concepts Based on Fuzzy Control and Classical Control Theory)," *ATP Automatisierungstechnische Praxis*, 35(6), pp. 349–354 (Jun. 1993).

Seborg et al., *Process Dynamics and Control*, Ch. 12, 13 and 18, John Wiley & Sons, Inc. U.S.A., pp. 272–309, 412–442 (1989).

Singh, "Stability Analysis of Discrete Fuzzy Control System," Proceedings of 1st *IEE Int'l Conf. on Fuzzy Systems*, pp. 527–536 (1992).

Smith and Corner, "An Algorithm for Automated Fuzzy Logic Controller Tuning," *IEEE Int'l Conf. on Fuzzy Systems*, pp. 615–622 (Mar. 1992).

Smith and Corner, "Self–Tuning Of A Fuzzy Logic Controller Using A Cell State Space Algorithm," *IEEE Int'l Conf. on Systems, Man and Cybernetics*, pp. 445–450 (Nov. 1990).

Sugeno, "An Introductory Survey of Fuzzy Control," 36 *Information Sciences* pp. 59–83 (1985).

Takahashi, "Automatic Speed Control Device Using Self–Tuning Fuzzy Logic," *IEEE*, pp. 65–71 (1988).

Tang and Mulholland, "Comparing Fuzzy Logic with Classical Controller Designs," *IEEE Transactions on Systems, Man, and Cybernetics*, 17(6), pp. 1085–1087 (Nov./Dec. 1987).

Tseng et al., "Fuzzy Servocontroller: The Hierarchical Approach," *IEEE Int'l Conf. on Fuzzy Systems*, pp. 623–631 (Mar. 1992).

Tsukagoshi and Wakaumi, "Highly–Reliable Semi–Autonomous Vehicle Control On Lattice Lane," *IEEE Int'l Workshop on Intelligent Robots and Systems*, vol. 2, pp. 731–738 (Jul. 1990).

Wojsznis, "An Alternative Fuzzy Logic Controller Design: A Simulation Study," 1994 Int'l Control Eng. Conf., pp. 159–167 (Mar. 1994).

Ying et al., "Fuzzy Control Theory: A Nonlinear Case," *Automatica*, 26(3), pp. 513–520 (1990).

Zheng, "A Practical Guide To Tune Of Proportional And Integral (PI) Like Fuzzy Controllers," *IEEE Int'l Conf. on Fuzzy Systems*, pp. 633–640 (Mar. 1992).

Zheng et al., "STFC–Self–Tuning Fuzzy Controller," *IEEE*, pp. 1603–1608 (1992).

"Installing and Using Type ACS401 Intelligent Tuner," Fisher–Rosemount Systems User Manual (1994).

Åstrom and Hägglund, "Automatic Tuning of Simple Regulators," *Proceedings of the IFAC*, pp. 1867–1872 (1984).

Buckley and Ying, "Fuzzy Controller Theory: Limit Theorems for Linear Fuzzy Control Rules," *Automatica*, 25 (3), pp. 469–472 (1989).

Hang and Sin, "Development of an Intelligent Self–Tunning PID Controller," *Advances in Instrumentation and Control*, vol. 47 (Part 2), pp. 1101–1111 (1992).

Harris and Moore, "Phase Plane Analysis Tools For a Class of Fuzzy Control Systems," *Proceedings of IEEE*, pp. 511–518 (1992).

Lane, "A Modular Self–Tunning Control System," *ISA Paper*, pp. 639–651 (1986).

Mamdani, "Application of Fuzzy Algorithms for Control of Simple Dynamic Plant," *Proceedings of IEEE*, 121(12), pp. 1585–1588 (Dec. 1974).

McMillan et al., "Flexible Gain Scheduler," *ISA Transactions*, vol. 33, No. 1, pp. 35–41 (May 1994), presented at an ISA Conference in 1993.

Østergaard, "Fuzzy Logic Control of a Heat Exchanger Process," *Fuzzy Automata and Decision Processes*, ch. 19, pp. 285–320 (1977).

Qin and Borders, "A Multi–Region Fuzzy Logic Controller for Controlling Processes with Nonlinear Gains," *Proceedings of the 1993 Int'l Symposium on Intelligent Control*, pp. 445–450 (1993).

Stoll et al., "Simplify Fuzzy Control Implementation," *Hydrocarbon Processing*, pp. 49, 50, 52 and 55 (Jul. 1993).

Yuwana and Seborg, "A New Method for On–Line Controller Tunning," *AIChE Journal*, 28(3), pp. 434–440 (May 1982).

Zadeh, "Interpolative Reasoning in Fuzzy Logic and Neural Network Theory," *Proceedings of 1st Int'l Conference on Fuzzy Systems*, p. 1 (Mar. 1992).

Readers' Forum, "On Fuzzy Control and Fuzzy Reviewing...," *IEEE Control Systems*, pp. 5–7 and 86 (Jun. 1993).

1

METHOD OF ADAPTING AND APPLYING CONTROL PARAMETERS IN NON-LINEAR PROCESS CONTROLLERS

TECHNICAL FIELD

The present invention relates generally to process controllers and more particularly to non-linear process controllers, such as fuzzy logic controllers, which develop control parameters for controlling a process in response to load disturbances and set point changes.

BACKGROUND ART

It is known to use a process controller, such as a proportional-integral (PI) controller, a proportional-integral-derivative (PID) controller or a fuzzy logic controller (FLC), to control a process so as to keep a process variable equivalent to a desired set point value. Such process controllers typically use a set of control parameters which have been developed in a desired optimal manner to control the process variable. Although these control parameters may be developed according to any one of a number of techniques, they are typically dependent on the anticipated range of differences or process control error values that result between the process variable and the set point during actual operation of the process.

The difference between the process variable and the set point may result from load disturbances within the process, which may be a function of noise or the physical characteristics of the process components, or from a change in the set point value, which may occur as a result of an operator input or other outside parameters. Load disturbances occur in a frequent manner during process operation but, typically, process control errors developed as a result of load disturbances are small. On the other hand, the set point value is not usually changed during process operation and, consequently, process control errors caused by set point changes do not occur frequently. However, process control errors resulting from set point changes are usually quite large as compared with process control errors caused by Load disturbances.

Because process control errors resulting from load disturbances are quite different than process control errors resulting from set point changes, the optimal control parameters used by the process controller in responding to each of these types of errors are also different. Nevertheless, most current process controllers and particularly non-linear process controllers are designed using control parameters which make the controller respond optimally to one of either load disturbances or set point changes and thus, poorly with respect to the other. Alternatively, process controllers use control parameters which have been developed to effect a trade-off between load disturbance performance and set point change performance. These process controllers may operate satisfactorily, but suboptimally, with respect to both load disturbances and set point changes.

Although it is desirable to operate any process controller optimally with respect to both load disturbances and set point changes, it is especially desirable to do so in nonlinear controllers, such as fuzzy logic controllers (FLCs), which are becoming more widely applied in the industrial environment and which are, therefore, beginning to compete with typical linear controllers. As discussed in Ying et al., "Fuzzy Control Theory: A Non-Linear Case," *Automatica*, 26(3) pp. 513–520 (1990), a conventional PID controller can be reproduced using a FLC. FLCs which emulate conventional PI and PID controllers are referred to as fuzzy PI and fuzzy PID controllers, respectively.

There have been some attempts to operate linear controllers differently in response to set point changes and load disturbances. For example, Takahashi et al., U.S. Pat. No. 5,043,862, discloses an apparatus for use in a PID controller which develops one set of PID constants when a set point change occurs and a second set of PID constants when a load disturbance occurs. Takahashi does not, however, adapt this type of control to non-linear controllers, such as fuzzy logic controllers.

Fuzzy logic controllers typically use a set of scaling factors associated with a set of membership functions to translate continuous input signals into fuzzy logic variables. A set of fuzzy logic inference rules are then applied to the fuzzy logic variables to determine an output fuzzy logic signal which is, in turn, converted into a continuous signal for use in controlling the process. Although the scaling factors can be determined in a number of ways, most FLCs determine the scaling factors from values developed from the process being controlled, i.e., from one or more process characteristics. The process of periodically measuring one or more process characteristics and developing a new set of scaling factors based on those process characteristics is referred to as tuning the controller.

One problem associated with tunable FLCs is that the resulting scaling factors do not account for process control errors caused by changes in the set point of the system. This problem occurs because process control errors caused by changes in the set point are not necessarily related to the process being controlled and, therefore, cannot be determined or anticipated from the process characteristics measured during the tuning process. Fuzzy logic controllers which are tuned to respond to set point changes, have traditionally been tuned to an anticipated set point change value and, therefore control a process in the same manner for both large and small set point changes.

This procedure results in poor overall performance of a FLC in responding to a wide range of set point changes because it does not account for the actual magnitude of the process control errors caused by a set point change.

SUMMARY OF THE INVENTION

In accordance with the present invention, a non-linear process controller derives a set of process control parameters depending on whether there has been a load disturbance in the process or a set point change. In a preferred embodiment of the invention, a first set of control parameters is determined to control the process in response to anticipated load disturbances in an optimal manner while further sets of control parameters are determined to control the process in response to set point changes in an optimal manner. Each of these further sets of control parameters are calculated in accordance with the magnitude of a particular set point change and are used by the controller in responding to that particular set point change. According to this invention, the controller first determines whether the difference between a process variable and a set point results from a set point change or a load disturbance and then determines and/or applies the appropriate control parameters to control the process in response thereto.

Preferably, the non-linear controller includes a detector which detects a set point change and a processor coupled to the detector for calculating a set of control parameters used in controlling the process in response to the set point change. The controller may determine the set point change control parameters according to the magnitude of the set point change and one or more process characteristics, which may compromise the time delay of the process and the dominant time constant of the process. When a load disturbance occurs, the processor controls the process in accordance with a set of control parameters developed to be optimal in response to anticipated load disturbances.

According to another aspect of the invention, a fuzzy logic controller, which controls a process in response to a set point change, calculates control parameters in response to the measured magnitude of the set point change and a process characteristic. Preferably, calculations of the control parameter are determined as a function of the time delay and the dominant time constant of the process and in proportion to the measured change in the set point. The fuzzy logic controller may include a fuzzification unit which uses two membership functions for transforming continuous signals into fuzzy variables.

The control parameter may comprise a set of scaling factors including an error scaling factor, a change in the error scaling factor and a change in the control signal scaling factor. In such a case, calculations of the change in the error scaling factor may be made as a function of a process characteristic and the magnitude of the change in the set point. Calculations of the error scaling factor may be made as a function of the change in the error scaling factor and the integral time constant of the controller. Calculations of the change in the control signal scaling factor may be made as function of the change in the error scaling factor and the proportional gain of the controller.

Still further, the controller may be responsive to a base set point change factor and to a process characteristic to derive a set of nominal scaling factors. The controller may alter one or more of the nominal scaling factors by a multiplier and by the ratio of the measured set point change to the base set point change factor to develop the set of scaling factors for use in controlling the process in response to the change in the set point. Preferably, the fuzzy logic controller uses this set of scaling factors to develop the process control signal from a time when the set point change occurs until a time when the process variable remains within a predetermined range of the set point for a predetermined amount of time.

According to another aspect of the present invention, a method of controlling a process in response to a change in a set point and a process characteristic includes the steps of measuring the magnitude of a change in the set point and developing a set of control parameters in response to the process characteristic and the measured magnitude of the change in the set point. The process is then controlled in accordance with the set of control parameters in response to the set point change. Preferably, the process characteristics include the time delay and the dominant time constant of the process and/or the ultimate gain and the ultimate period of the process.

BRIEF DESCRIPTION OF THE DRAWINGS

These and other features and advantages will become more apparent from a detailed consideration of the invention when taken in conjunction with the drawings in which.

DETAILED DESCRIPTION

Figure 1:
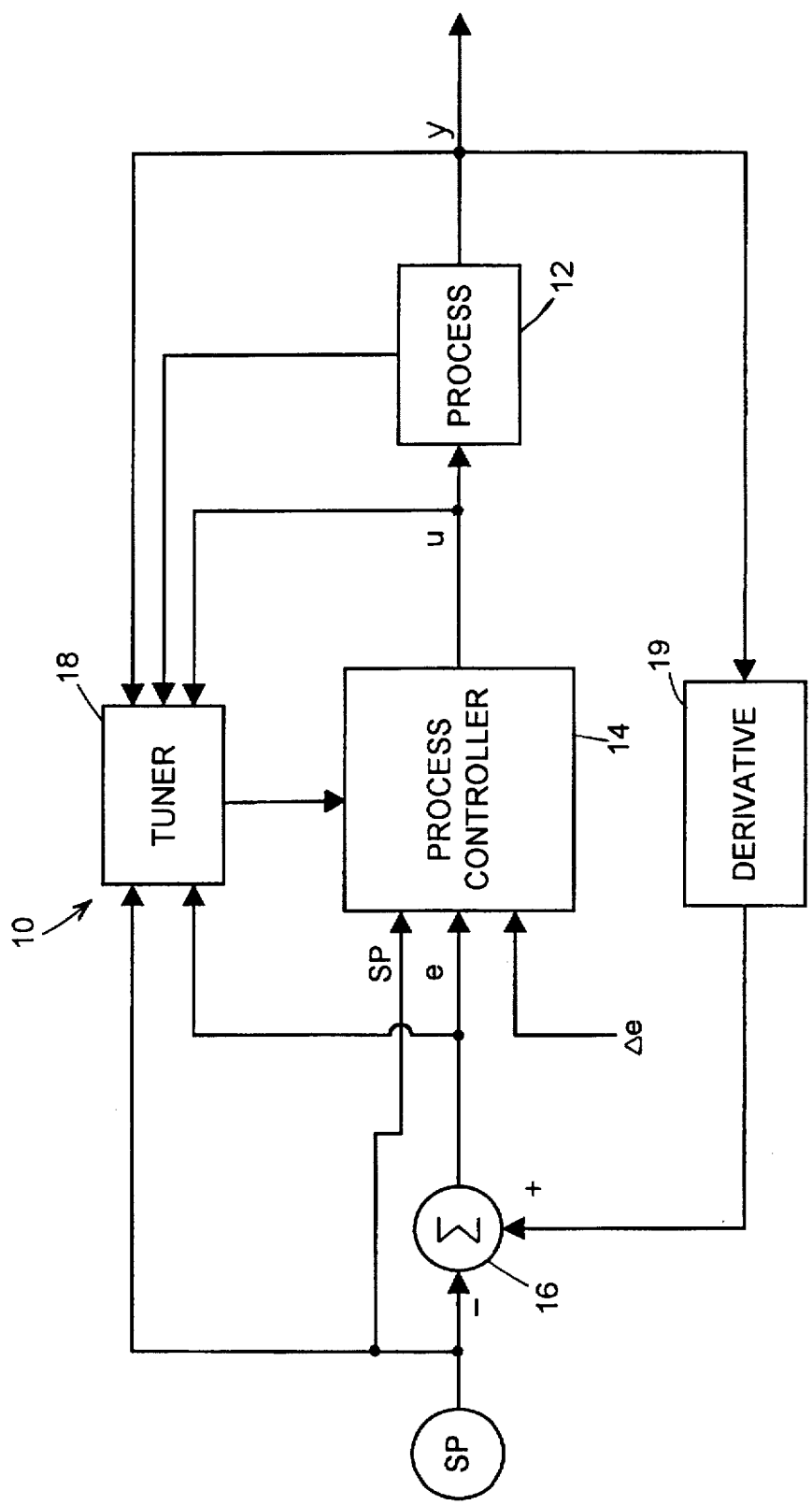
FIG. 1 is a block diagram of a tuner and a generalized process control system which controls a process in accordance with the present invention.

Referring now to FIG. 1, a process control system 10 is adapted for controlling a process 12 according to one of multiple sets of control parameters. The process 12 may be any type of process including for example, a first order plus dead time process. As is typical in process control systems, the system 10 includes a process controller 14, a summing network 16 and an automatic tuner 18. The process controller 14 may be a proportional-integral (PI) controller, a proportional-integral-derivative (PID) controller, any type of fuzzy logic controller or any other desired type of controller which produces a control signal u for controlling the process 12. If derivative control is desired, a derivative control block 19 may also be included in the process control system 10.

An output of the process 12, illustrated in FIG. 1 as a process variable y, is fed back through the derivative control block 19 to the summing network 16 and compared with a set point SP, which may be set or controlled by an operator or developed in any other desired manner. The output of the summing network 16 is an error signal e which represents the difference between the set point SP and the process variable y. The error signal e is delivered to the process controller 14. A change in the error signal $\Delta e$, which is equal to the difference between the current error signal and the error signal from the previous sampling interval ($\Delta e = e(t) - e(t - \Delta t)$, where $\Delta t$ is the sampling interval), is also delivered to the process controller 14. Although the change in the error signal $\Delta e$ is illustrated as an input to the process controller 14, the change in the error signal $\Delta e$ may also be developed within the process controller 14 from the error signal e.

The tuner 18 senses various measurable quantities existing within the process control system 10 and/or the process 12 to determine one or more process characteristics of the process 12. These process characteristics are delivered to the process controller 14 for use in developing one or more of the sets of control parameters. The tuner 18 may be any desired type of tuner which uses either open-loop or closed-loop techniques and may measure any desired variables including, for example, the process variable y, the set point SP, the error signal e and/or the process control signal u, to determine the desired process characteristics.

Figure 2:
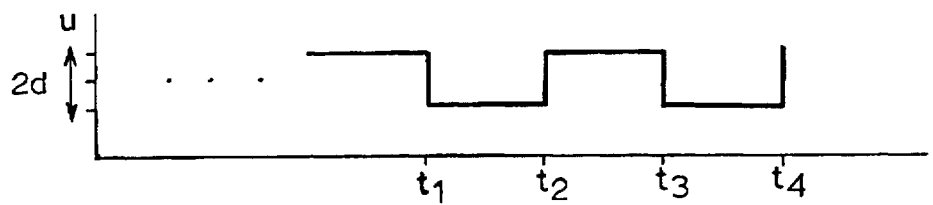
FIG. 2 is a graph of an exemplary process input signal for use in a controlled induced oscillation tuning procedure.
Figure 3:
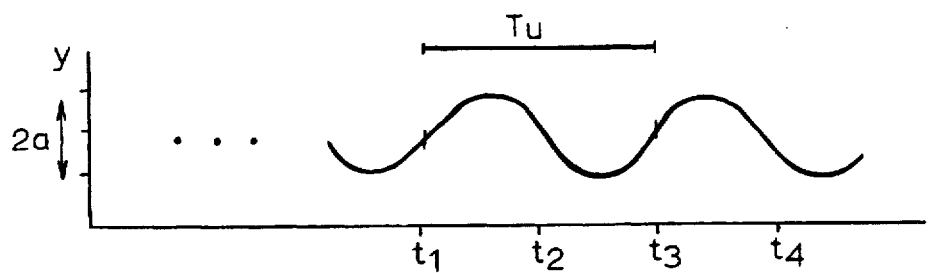
FIG. 3 is a graph of an exemplary process output signal obtained during a controlled induced oscillation tuning procedure.

Preferably, the tuner 18 is configured to use a controlled induced oscillation procedure in determining the desired process characteristics. In such a configuration, the tuner 18 includes a signal generator (not shown) which applies a square wave signal having a selectable peak-to-peak value of 2d, was illustrated in the graph of FIG. 2, centered about the value of the control signal u before induced oscillation was initiated. In response to such a square wave signal, the process 12 undergoes induced oscillation and the process variable y oscillates having a peak-to-peak amplitude 2a and a period $T_u$, as illustrated in the graph of FIG. 3. From the amplitude a of the process variable y and the amplitude of the square wave signal, the ultimate gain $K_u$ of the process 12 can be derived according to the equation:

$$K_u = \frac{4d}{\pi a} \quad (1)$$

and the ultimate period $T_u$ of the process 12 is calculated as being equal to the period of oscillation of the process variable y.

Thus, after the tuner 18 has driven the process 12 into steady state oscillation, the tuner 18 measures the process variable y to determine the values $K_u$ and $T_u$. The tuner 18 or any other desired component may also measure other desired process characteristics including, for example, the time delay $T_d$ and the dominant time constant of the process 12 in any desired manner. Then, using known tuning methods, including internal model control (IMC) tuning, Cohen and Coon tuning, Ziegler-Nichols tuning, or modified Ziegler-Nichols tuning, to name a few, the tuner 18 or the process controller 14 calculates, from the quantities $K_u$ and $T_u$, a preliminary set of control parameters including, for example, the proportional gain $K_p$ and the integral time constant $T_i$ of the process controller 14.

An exemplary controlled induced oscillation tuner uses a relay type control procedure, such as a Hägglund-Åström relay tuning procedure described in U.S. Pat. No. 4,549,123, the disclosure of which is expressly incorporated herein by reference. In the relay type tuning method, the tuner 18 brings the process 12 into self-oscillation using a non-linear disturbance control function (not shown) and measures the response of the process 12 to determine the desired process characteristics.

Alternatively, the tuner 18 may be any one of the tuners described in a co-pending patent application, Ser. No. 08/105,899, entitled "Method and Apparatus for Fuzzy Logic Control with Automatic Tuning," filed Aug. 11, 1993, and assigned to the assignee of the present invention, the disclosure of which is expressly incorporated herein by reference. For example, the tuner 18 may perform a model matching tuning procedure in which signature analysis is performed on the process variable y to select, from a plurality of stored mathematical models, the model that most accurately characterizes the process 12. Then, the process characteristics of the process 12 are determined from the selected model.

Alternatively, the tuner 18 may determine the process characteristics of the process 12 using a pattern-recognition method of process characterization, such as that disclosed in U.S. Pat. No. 4,602,326, the disclosure of which is expressly incorporated herein by reference. In the pattern recognition method of tuning, the characteristics of the process 12 are determined by observing the process variable y as it responds to a process upset condition. The pattern of the process variable y produced as a result of the process upset condition is then analyzed to determine the desired characteristics of the process 12.

Still further, the tuner 18 may use any signal injection method of determining the characteristics of the process 12 such as, for example, those disclosed in U.S. Pat. No. 5,283,729 and co-pending U.S. Pat. No. 5,453,925 entitled "System and Method for Automatically Tuning a Process Controller," issued Sep. 26, 1995, and assigned to the assignee of the present invention, the disclosure of each of which is expressly incorporated herein by reference.

In any event, the derived dynamic process characteristics, such as the ultimate gain $K_u$, the ultimate period $T_i$, the time delay $T_d$ and the dominant time constant $T_c$ or any other desired process characteristics, are delivered to the process controller 14 and are used directly, or in the manner described in more detail below, to calculate one or more sets of the control parameters used by the process controller 14. Alternatively, an operator may enter the appropriate process characteristics, such as the ultimate gain and the ultimate period of the process or the preliminary set of control parameters developed in accordance with the process characteristics, such as the proportional gain $K_p$ and the integral time constant $T_i$ into the process controller 14.

According to the present invention, the process controller 14 is responsive to the set point SP and to the process characteristics developed by the tuner 18 or to the preliminary set of control parameters and calculates one or more sets of control parameters, wherein at least one of the sets of control parameters is developed from a magnitude of a set point change. Preferably, the process controller 14 calculates or determines a set of load disturbance control parameters in a manner which is optimal for responding to load disturbances and, during operation, calculates multiple sets of set point change control parameters which are optimal for responding to individual set point changes. Also preferably, each set of set point change control parameters is developed as a function of the measured magnitude of a particular set point change and is used in controlling the process in response to that particular set point change During operation, whenever an error signal e appears at an input to the process controller 14, the process controller 14 determines if a set point change has occurred. If a set point change has not occurred, indicating that the error signal e occurred as a result of a change in the process variable y, the process controller 14 uses the error signal e, the change in the error signal Δe and the set of load disturbance control parameters to develop the control signal u. However, when the process controller 14 determines that a change in the set point SP has occurred, the process controller 14 develops a set of set point change control parameters based on the magnitude of the set point change and then uses the error signal e, the change in the error signal Δe and this set of set point change control parameters to develop the control signal u. In this manner, the process controller 14 develops a process control signal u which is best suited to eliminate the error between the process variable y and the set point SP whether the error signal e is caused by a load disturbance or by a change in the set point SP.

Figure 4:
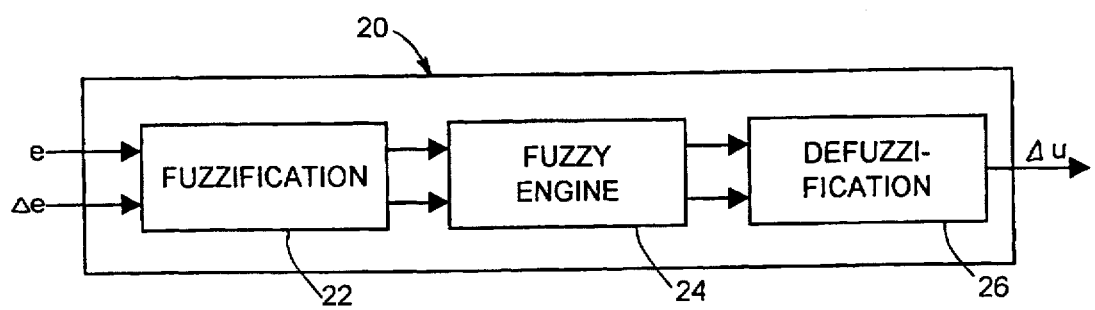
FIG. 4 is a block diagram of a fuzzy logic controller for use in accordance with the present invention.

Although, the process controller 14 can include any type of controller, a preferred embodiment of a control system which operates according to the present invention uses a non-linear controller, such as a fuzzy logic controller (FLC), which may be any type of FLC including two or more membership functions. Referring now to FIG. 4, a typical FLC 20 will be generally described. The FLC 20 includes an input signal fuzzification block 22, a fuzzy engine block 24 and a defuzzification block 26. The fuzzification block 22 translates or transforms the continuous error signal e and the continuous change in the error signal Δe into linguistic fuzzy variables, such as, for example, Positive Large, Negative Large, Zero, etc., with the use of so-called fuzzy membership functions. Likewise the defuzzification block 26 translates a fuzzy variable representing a change in a control action into a continuous change in the control signal Δu with the use of fuzzy membership functions.

The fuzzy membership functions used in the fuzzification block 22 and the defuzzification block 26 may be defined based on prior knowledge about the process. To illustrate how to define the membership functions for the error signal e, the charge in the error signal Δe and the change in the control signal Δu, it is convenient to use the scaled variables:

$$e^* = \frac{e}{S_e} \quad (2)$$

$$\Delta e^* = \frac{\Delta e}{S_{\Delta e}} \quad (3)$$

$$\Delta u^* = \frac{\Delta u}{S_{\Delta u}} \quad (4)$$

where $S_e$, $S_{\Delta e}$ and $S_{\Delta u}$ are scaling factors for e, Δe and Δu, respectively. The signals $e^*$, $\Delta e^*$ and $\Delta u^*$ are scaled so that they each have values that are greater than or equal to −1 and less than or equal to 1.

Figure 5A:
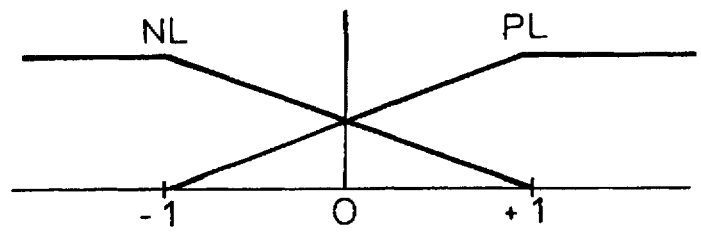
FIGS. 5a, 5b, 5c and 5d illustrate exemplary membership functions used in the fuzzy logic controller of FIG. 4.
Figure 5B:
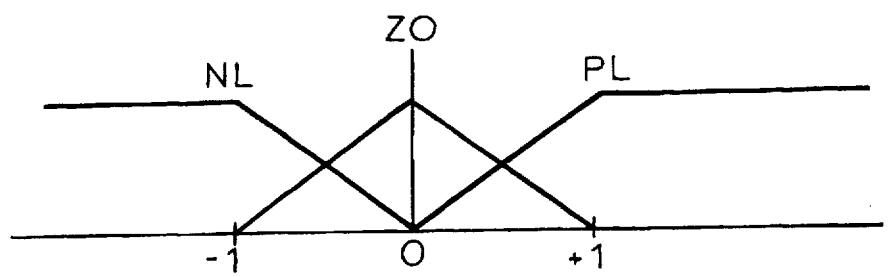
Figure 5C:
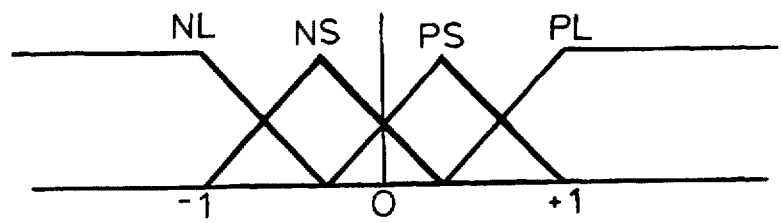

Possible sets of fuzzy membership functions for the variables $e^*$, $\Delta e^*$ and $\Delta u^*$ are given in FIGS. 5a, 5b, 5c and 5d. Specifically, FIG. 5a illustrates two membership functions which may be used for the scaled error signal $e^*$ and the scaled change in the error signal $\Delta e^*$. FIG. 5b illustrates three membership functions which may be used for conditioning the scaled change in the control signal $\Delta u^*$ when the scaled error signal $e^*$ and the scaled change in the error signal $\Delta e^*$ are conditioned using the two membership functions shown in FIG. 5a. Similarly, when the four membership functions illustrated in FIG. 5c are used for conditioning the scaled error signal $e^*$ and the scaled change in the error signal $\Delta e^*$, the five membership functions of FIG. 5d can be used for the scaled change in the control signal $\Delta u^*$.

As illustrated in the FIGS. 5a, 5b, 5c and 5d, the membership partitions are symmetric from −1 to 1, and the following descriptions are used to describe the various membership functions:

| NL- | Negative large |
| NS- | Negative small |
| ZO- | Zero |
| PS- | Positive small |
| PL- | Positive large |

Referring again to FIG. 4, the fuzzy engine block 24 operates on the fuzzified input signals developed by the fuzzification block 22 by applying inference rules comprising, for example, a set of linguistic rules which incorporate human experience, to produce a control action. In general, an inference rule for a FLC can be described as follows:

$$\{\text{If } e^* \text{ is } A_i \text{ and } \Delta e^* \text{ is } B_i, \text{ then make } \Delta u^* \ C_i\} \quad (5)$$

wherein each of $A_i$, $B_i$, and $C_i$ is a descriptor (such as NL, NS, ZO, PS, or PC), for $e^*$, $\Delta e^*$ and $\Delta u^*$, respectively. A fundamental requirement of these rules is that they perform negative feedback control for the sake of stability.

Figures 5D, 6A, 6B:
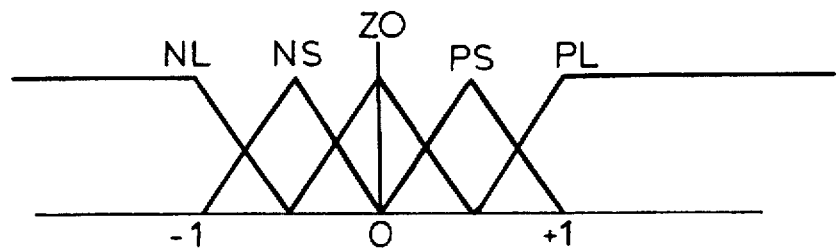
FIGS. 6a and 6b are tabular representations of exemplary fuzzy logic controller rules used in the fuzzy logic controller of FIG. 4.

An exemplary set of four inference rules is illustrated in tabular form in FIG. 6a and an exemplary set of sixteen rules is illustrated in FIG. 6b. Four rules are used when each of variables $e^*$ and $\Delta e^*$ are conditioned by two membership functions (FIG. 5a) and sixteen rules are used when each of variables $e^*$ and $\Delta e^*$ are conditioned by four membership functions (FIG. 5c). However, any desired number of rules and membership functions can be used in the fuzzification block 22 to translate the error signal e and the change in the error signal Δe into fuzzy logic variables for use by the fuzzy engine block 24. Furthermore, any desired number of membership functions can be used in the defuzzification block 26 to translate the change in the control action into the continuous signal Δu.

After the inference rules are applied to establish the required scaled change in the control signal $\Delta u^*$ from the membership functions of the scaled error signal $e^*$ and the scaled change in the error signal $\Delta e^*$, defuzzification of the scaled change in the control signal $\Delta u^*$ is performed by the defuzzification block 26. Defuzzification may be performed using any desired method including, for example, the center of gravity defuzzification method and the generalized center of gravity defuzzification method. Thereafter, the scaled change in the control signal $\Delta u^*$ is descaled by multiplication with the scaling factor $S_{\Delta u}$ to arrive at the change in the control signal Δu which, when added to the previous control signal, comprises the control signal u.

As noted above, two distinct features of the FLC 20 are that human experience can be integrated into the control signal u and that the FLC 20 provides a non-linear relationship between the input signals e and Δe and the output signal Δu developed by the FLC 20. A particular advantage arises as a result of using a nonlinear fuzzy logic controller in accordance with the present invention over a typical linear PI or PID controller and will be described in conjunction with FIGS. 7 and 8.

Figure 7:
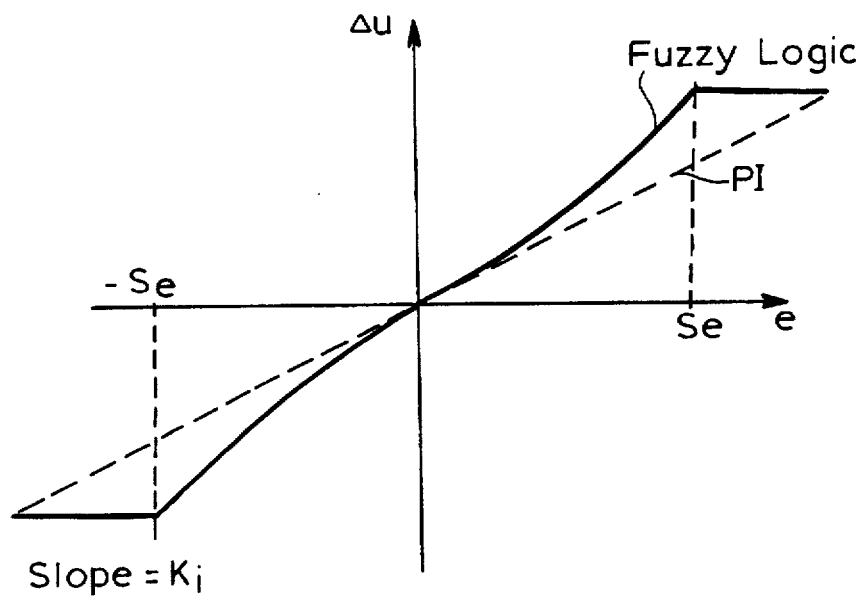
FIG. 7 is a graph comparing the integral gain response of a two membership function fuzzy logic controller with that of a PI controller.
Figure 8:
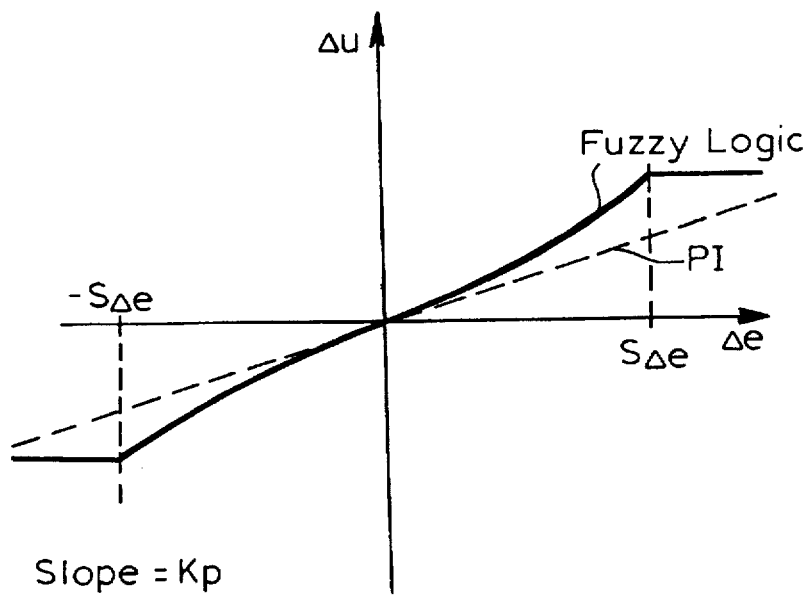
FIG. 8 is a graph comparing the proportional gain response of a two membership function fuzzy logic controller with that of a PI controller.

FIG. 7 is a graph plotting the change in the control signal Δu versus the error signal e for a PI controller and for a FLC having a fuzzification block which uses two membership functions. The slope of the lines at any particular point in the graph of FIG. 7 indicates the integral gain $K_i$ of the controller at that operational point. FIG. 8 is a graph plotting the change in the control signal Δu versus the change in the error signal Δe for a PI controller and for a FLC having a fuzzification block which uses two membership functions. The slope of the lines at any particular point in the graph of FIG. 8 indicates the proportional gain $K_p$ of the controller at that operational point.

As illustrated in FIGS. 7 and 8, the integral gain $K_i$ and the proportional gain $K_p$ of a fuzzy logic controller are approximately equal to the integral gain and the proportional gain, respectively, of a PI controller when the error signal e and the change in the error signal Δe are small. However, as indicated in FIG. 7, the integral gain $K_i$ of the fuzzy logic controller becomes substantially greater than the integral gain of the PI controller when the error signal e approaches a maximum error value $S_e$, to which the PI and fuzzy logic controllers have been tuned. Likewise, as indicated in FIG. 8, the proportional gain $K_p$ of the fuzzy logic controller becomes substantially greater than the proportional gain of the PI controller when the change in the error signal Δe approaches a maximum change in error value $S_{\Delta e}$, to which the PI and fuzzy logic controllers have been tuned. As a result, a fuzzy logic controller, and particularly one using two membership functions in the fuzzification block, has a better response characteristic than a similarly tuned PI or PID controller when the error signal e and/or the change in the error signal Δe approach the maximum errors specified for the system, i.e., $S_e$ and $S_{\Delta e}$, respectively.

Because of the phenomena illustrated in the graphs of FIGS. 7 and 8, a FLC responds faster to larger error and change in error signals (caused by either load disturbances or set point changes) than a similarly tuned PI or PID controller. However, when the error signal e and the change in the error signal Δe are small, i.e., remain within a region close to the origin on the graphs of FIGS. 7 and 8, the FLC provides control actions similar to PI or PID controllers.

One complication in achieving the best response for both load disturbances and set point changes occurs because the anticipated value of the error e caused by load disturbances is typically much less than the anticipated value of the error e caused by changes in the set point SP. Thus, controlling the process similarly for both set point changes and load disturbances requires a trade off in the selection of the appropriate process control parameters used by the controller in developing the process control signal u. Specifically, if the FLC 20 is tuned to operate optimally with respect to the anticipated changes in the set point SP (i.e., if the values $S_e$ and $S_{\Delta e}$ are set equal to the maximum or anticipated values of the error signal e and the change in the error signal $\Delta e$, respectively, caused by set point changes) the FLC 20 will operate in the regions close to the origin in the graphs of FIGS. 7 and 8 when an error e is caused by a load disturbance. This operation is only marginally better than a PI or a PID controller and does not take full advantage of the non-linearity provided by the FLC 20. However, if the FLC 20 is tuned to operate optimally in response to the expected load disturbance (i.e., if the values $S_e$ and $S_{\Delta e}$ are set equal to the maximum or anticipated values of the error signal e and the change in the error signal $\Delta e$, respectively, caused by load disturbances) then the FLC 20 will respond more slowly or sluggishly to larger set point changes.

However, optimal response of the FLC system can be achieved in responding to both load disturbances and set point changes by using different control parameters in response to load disturbances and set point changes. In other words, optimal performance can be accomplished by (1) determining a set of process control parameters associated with the anticipated range of load disturbances using, for example, any one of the above-described tuning methods or any other desired method, and then using these process control parameters to control the process in response to load disturbances and (2) determining a set of process control parameters based on the actual magnitude of a set point change when a set point change occurs and then using this set of process control parameters to control the process in response to that set point change. Using the actual magnitude of the set point change to develop the set point change control parameters for each set point change is particularly desirable because it prevents the controller from operating in the region close to the origin in FIGS. 7 and 8 in response to set point changes. That is, setting the maximum value of $S_e$ and $S_{\Delta e}$ in FIGS. 7 and 8 to the actual magnitude of the change in the set point assures that the controller operates in the region away from the origin of FIGS. 7 and 8 in response to the set point change.

As the number of membership functions of a FLC increases, the responses of the FLC indicated in the graphs of FIGS. 7 and 8 approach the responses of the PI controller. As a result, FLCs lose their advantage over PI and PID controllers as the number of membership functions within the FLC increases. Therefore, the FLCs described hereinafter preferably use two membership functions within the fuzzification block to translate the input signals e and $\Delta e$ into fuzzy logic signals.

Figure 9:
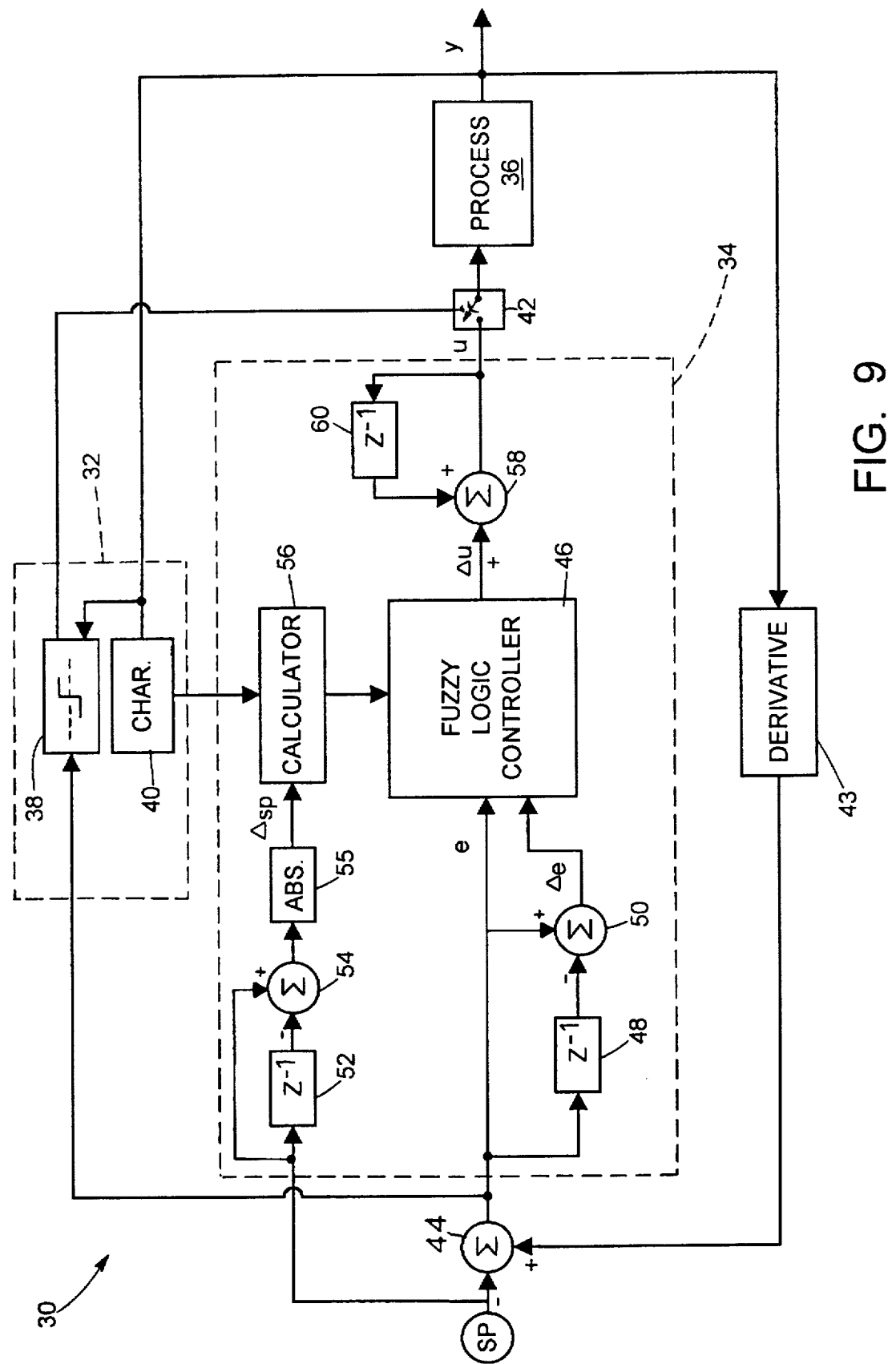
FIG. 9 is a combined block and schematic diagram of a tunable fuzzy logic control system which controls a process in accordance with the present invention.

Referring now to FIG. 9, a fuzzy logic control system 30, which operates according to the present invention, includes a tuner 32 and a process controller 34 for controlling a process 36. Preferably, the tuner 32 is a Hägglund-Åström relay type tuner including a non-linear element 38 and a characterization block 40. The non-linear element 38 is connected to the control action of the process 36 through a switch 42 and is responsive to a process variable y produced by the process 36. Alternatively, the non-liner element 38 may be responsive to the error signal e representing the difference between the process variable y and the set point SP. The characterization block 40 is responsive to the process variable y for determining one or more process characteristics.

During tuning, the non-linear element 38 delivers an alternating control signal through the switch 42 to the process 38. This alternating control signal has a selectable maximum amplitude as illustrated in FIG. 2, for example, and drives the process 38 into controlled oscillation such that the process variable y oscillates as illustrated in FIG. 3. The characterization block 40 then determines process characteristics comprising the ultimate gain $K_u$ and the ultimate period $T_u$ of the process 36, from the process variable y, and delivers these process characteristics to the process controller 34. Additionally, the tuner 32 may measure any other desired process characteristics including the time delay $T_d$ and dominant time constant $T_c$ of the process 36 using any desired method. Preferably, the tuner or other unit measures or determines the time delay $T_d$ and the dominant time constant $T_c$ according to the method disclosed in the above-referenced copending U.S. patent application Ser. No. 08/070,090, now U.S. Pat. No. 5,453,925 entitled, "System and Method for Automatically Tuning a Process Controller." The time delay $T_d$ (also referred to as the dead time) is the amount of time it takes the process variable y to begin to change in response to a change in the process control signal u. The dominant time constant $T_c$ (or simply, the time constant $T_c$) is the amount of time it takes for the process variable y to reach a predetermined percentage (typically, 63 percent) of its new desired value from the time the process variable y begins to respond to a change in the process control signal u. However, the tuner 32 may be any other desired type of tuner. Furthermore, the tuner 32 may be eliminated and the process characteristics may be input into the process controller 34 by an operator.

As is typical in process control systems, the process variable y is delivered, if desired, through a derivative control block 43 to a summing network 44 where it is compared with the set point SP, which may be input by an operator or determined according to any other desired technique. The output of the summing network 44 comprises the error signal e which is delivered to a FLC 46 of the process controller 34 and to a delay block 48 where it is delayed for one sampling interval. The output of the delay block 48, which may comprise any desired type of analog or digital delay unit, is provided to a further summing network 50 which subtracts the previous error signal from the current error signal to develop a change in the error signal $\Delta e$ which, in turn, is delivered to the FLC 46.

The set point SP is also provided to a delay block 52 where it is delayed for one sampling interval. The output of the delay block 52 is provided to a summing network 54 which subtracts the previous set point from the current set point to develop a signed change in the set point signal. The signed change in the set point signal is delivered to a block 55 which determines the absolute value of the signed change in the set point signal to develop the change in the set point signal $\Delta_{SP}$ which, in turn, is delivered to a calculator 56. The calculator 56 is responsive to the magnitude of the change in the set point signal $\Delta_{SP}$ and to the process characteristics developed by the tuner 32 and derives one or more sets of scaling factors $S_e$, $S_{\Delta e}$ and $S_{\Delta u}$ in the manner described below. The scaling factors $S_e$, $S_{\Delta e}$ and $S_{\Delta u}$ are then delivered to the FLC 46.

The FLC 46, which may be any type of fuzzy logic controller including, for example, a Zadeh fuzzy logic controller or a Lukasiewicz fuzzy logic controller, uses the error signal e, the change in the error signal Δe and the scaling factors $S_e$, $S_{\Delta e}$ and $S_{\Delta u}$ to develop a change in the control signal Δu according to any desired fuzzy logic technique. A preferred embodiment of the present invention uses the Zadeh AND function and the Zadeh OR function during rule inferencing and uses a center of gravity method of defuzzification using singleton output membership functions with all the weight focused on a single value. Also preferably, two membership functions are used in the fuzzification block and three membership functions are used in the defuzzification block of the FLC 46.

The change in the control signal Δu is then delivered to a summing network 58 where it is added to a previous control signal which has been delayed for one sampling interval by a delay block 60. The output of the summing network 58 comprises a control signal u which, during closed-loop operation, is applied to the process 36 through the switch 42 to force the process variable y to become equal to the set point SP.

During closed-loop operation, the calculator 56 responds to the process characteristics derived by the tuner 32 and develops one and, preferably, multiple sets of scaling factors $S_e$, $S_{\Delta e}$ and $S_{\Delta u}$ to be used by the FLC 46 in controlling the process 36. One set of scaling factors, i.e., a set of load disturbance scaling factors, is used by the FLC 46 in response to load disturbances while the other sets of scaling factors, i.e., sets of set point change scaling factors, are used by the FLC 46 in response to set point changes.

The load disturbance scaling factors may be derived by the calculator 56 in any desired manner or, alternatively, may be read from a memory (not shown) in the calculator 56. The calculator 56 provides the load disturbance scaling factors to the FLC 46 whenever the set point change signal $\Delta_{SP}$ is approximately zero or remains below an expected load disturbance error value. In this manner, the FLC 46 controls the process 36 in response to the load disturbance scaling factors when load disturbances are present within the process 36.

However, whenever a set point change occurs, as determined by a set point change signal $\Delta_{SP}$ having a non-zero magnitude or a magnitude above a predetermined level, the calculator 56 derives a set of set point change scaling factors and provides these scaling factors to the FLC 46. The FLC 46 then uses the derived set point change scaling factors to control the process 36 in response to the particular change in the set point. Preferably, the calculator 56 provides the set point change scaling factors to the FLC 46 for a predetermined amount of time, until the error signal e reaches a predetermined percentage of the new set point, or according to any other desired technique which indicates when the process variable y equals the new set point SP in a satisfactory manner. Thereafter, the calculator 56 once again provides the load disturbance scaling factors to the FLC 46 for use in controlling the process 36.

In accordance with the present invention, the calculator 56 derives values for the set point change scaling factors $S_e$, $S_{\Delta e}$ and $S_{\Delta u}$ as functions of the magnitude of the change in the set point signal $\Delta_{SP}$ and the process characteristics of the process 36 such as the ultimate gain $K_u$, the ultimate period $T_u$, the time delay $T_d$ and the dominant time constant $T_c$ of the process. Specifically, it has been found preferable to determine the change in the error scaling factor $S_{\Delta e}$ generally according to the magnitude of the set point change and more particularly according to the equation $$S_{\Delta e} = \beta \Delta_{SP} \tag{6}$$

where β is a multiplication factor. The most desirable values for the scaling factor $S_{\Delta e}$ are produced when the multiplication factor β is determined as a function of the time delay $T_d$ and the dominant time constant $T_c$ for the process 36. Preferably, the multiplication factor β is determined such that $$\beta = f\left(\frac{T_d}{T_c}\right) \tag{7}$$

where $T_d$ is the time delay of the process and $T_c$ is the dominant time constant of the process. The function f(·) should have an upper bound of 1 and a lower bound of 0.

Figure 10:
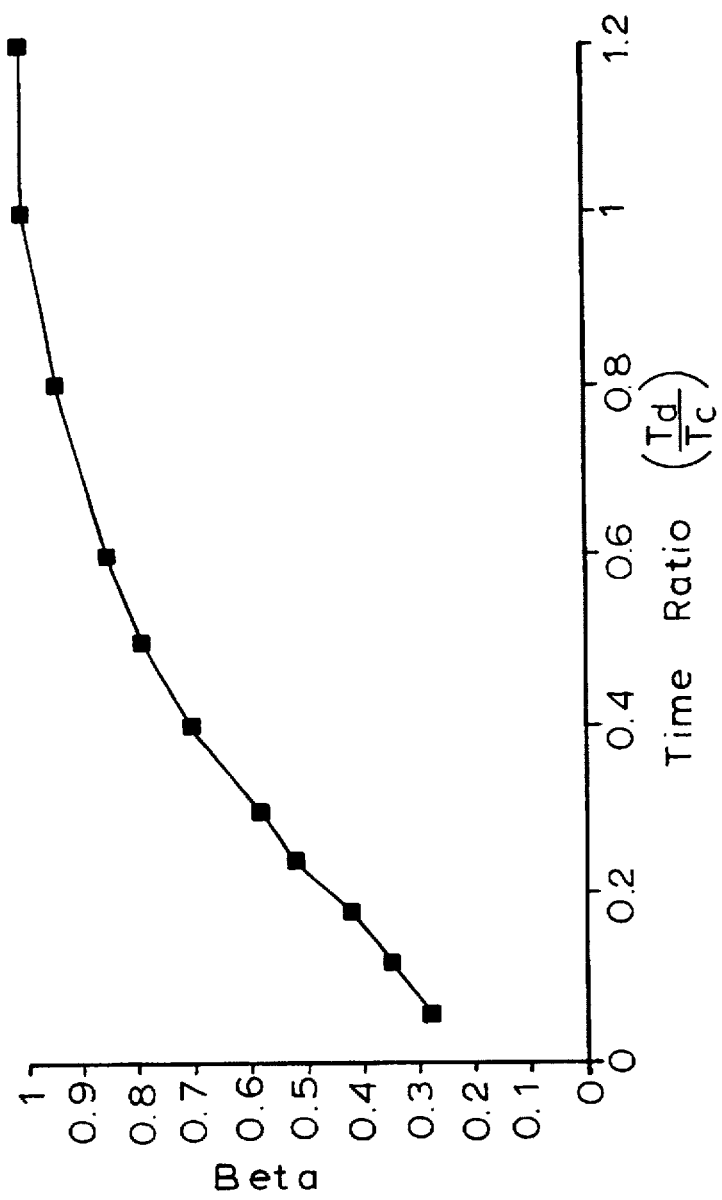
FIG. 10 is a graph of desirable values of a multiplication factor $\beta$ for use in a fuzzy PI controller according to the present invention.

When the ratio of the process time delay $T_d$ to the dominant process time constant $T_c$ is known or has been measured, fuzzy logic controllers may be tuned to achieve virtually no overshoot. However, satisfactory values of the scaling factor $S_{\Delta e}$ are obtained when the value of the multiplication factor β, as indicated in equation (6), is approximated with a constant. This fact is particularly true in first order plus dead time processes with moderate time delays, i.e., $0 \leq T_d \leq 0.4\ T_c$. For these processes, it has been found that a value of the multiplication factor β equal to approximately 0.4 gives satisfactory performance for fuzzy PI controllers and that a value of the multiplication factor β equal to approximately 0.28 gives satisfactory performance for fuzzy PID controllers. However, the graph of FIG. 10 plots other appropriate values for the multiplication factor β, based on the ratio of the process time delay $T_d$ to the dominant process time constant $T_c$ for fuzzy PI controllers. A plot of appropriate values for the multiplication factor β, based on the ratio of the process time delay $T_d$ to the dominant process time constant $T_c$ for fuzzy PID controllers would be similar to the plot of FIG. 10 and, specifically, would approximately match the graph of FIG. 10 at the lower time ratio values and would be offset below the graph of FIG. 10 at the higher time ratio values.

Once the change in the error scaling factor $S_{\Delta e}$ has been determined, the calculator 56 determines the proportional gain $K_p$ and the integral time constant $T_i$ from the process variables $K_u$ and $T_u$, as described above, and then derives the scaling factors $S_e$ and $S_{\Delta u}$ generally according to the equations:

$$S_e = \frac{T_i}{\Delta t} S_{\Delta e} \tag{8}$$

and $$S_{\Delta u} = 3 S_{\Delta e} K_p \tag{9}$$

where Δt is the sampling interval, $T_i$ is the integral time constant of the controller and $K_p$ is the proportional gain of the controller.

In particular, the scaling factors $S_e$, $S_{\Delta e}$ and $S_{\Delta u}$ are related to the non-linear PI controller proportional gain $K_p$ and integral time constant $T_i$ according to the following equations when Lukasiewicz OR logic is used for defuzzification:

$$K_p = \frac{S_{\Delta u}}{4(1 - 0.5\alpha) S_{\Delta e}} \tag{10}$$

$$T_i = \frac{S_e}{S_{\Delta e}} \Delta t \tag{11}$$

When Zadeh OR logic is used for defuzzification, the following calculations relate the scaling factors $S_{\Delta e}$, $S_e$ and $S_{\Delta u}$ to the variables $K_p$ and $T_i$:

$$K_p = \frac{S_{\Delta u}}{(3-\alpha)S_{\Delta e}} \quad (12)$$

$$T_i = \frac{S_e}{S_{\Delta e}} \Delta t \quad (13)$$

When controlled induced oscillation is used for self tuning, based on Ziegler-Nichols tuning rules, equations (10) and (12) may be expressed as equations (14) and (15), respectively:

$$S_{\Delta e} = \frac{\pi a S_{\Delta u}}{7.2(1-0.5\alpha)d} \quad (14)$$

$$S_{\Delta e} = \frac{\pi a S_{\Delta U}}{5.4\left(1-\frac{1}{3}\alpha\right)d} \quad (15)$$

In each of equations (10) through (15) the following definitions apply:

$$0 \leq \alpha = \text{Max}(|e^*|,|\Delta e^*|) \leq 1.0 \quad (16)$$

$\Delta t$=the sampling interval;

$K_p$=the proportional gain of the controller;

$T_i$=the integral time constant of the controller; and a, d=the quantities measured or determined during controlled induced oscillation as described above with reference to FIGS. 2 and 3.

The factor $\alpha$ adjusts the stability margin of the FLC and may be determined according to any desired method.

Figure 11:
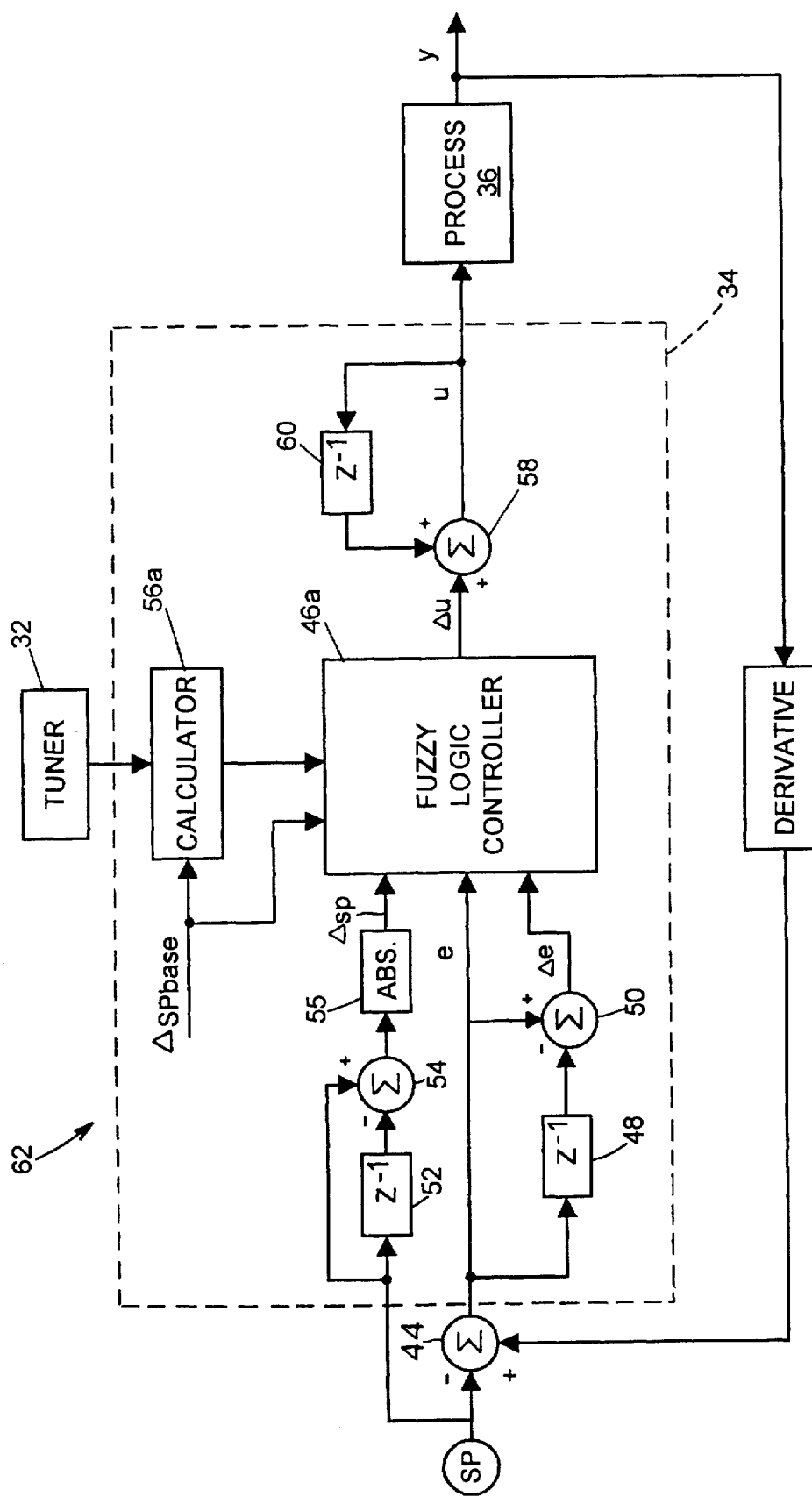
FIG. 11 is a combined block and schematic diagram of a further tunable fuzzy logic control system which controls a process in accordance with the present invention.

Referring now to FIG. 11, a further embodiment of the present invention is illustrated as a fuzzy logic control system 62. The fuzzy logic control system 62 is similar to the fuzzy logic control system 30 of FIG. 9, wherein like components are numbered identically and modified components are marked with an "a". The tuner 32, which is not shown in detail in FIG. 11, is preferably a Hägglund-Åström relay type tuner, such as an ACS201 Intelligent Tuner, manufactured and sold by Fisher-Rosemount Systems, Inc. and may also include the necessary components to measure the time delay $T_d$ and the dominant time constant $T_c$ of the process 36. However any other type of tuner may be used, it being understood that the tuner 32 is appropriately connected to the process 36 and the other components of the control system 62. Similar to the embodiment shown in FIG. 9, the tuner 32 measures the ultimate gain $K_u$ and the ultimate period $T_u$ of the process 36 and may measure the process time delay $T_d$ and dominant time constant $T_c$ of the process, and delivers these process characteristics to a calculator 56a.

As indicated in FIG. 11, the calculator 56a is responsive to a base set point change factor $\Delta_{SPbase}$ in addition to the process characteristics of the process 36 to determine a nominal set of scaling factors. In accordance with the present invention, the calculator 56a derives the nominal scaling factor $S_{\Delta e}$ according to the equation:

$$S_{\Delta e} = \beta \Delta_{SPbase} \quad (17)$$

where $\beta$ is the multiplication factor determined as described with respect to the embodiment of FIG. 9. Next, the calculator 56a determines the values of the nominal scaling factors $S_e$ and $S_{\Delta u}$ from the nominal scaling factor $S_{\Delta e}$ in any manner as described above with respect to the embodiment of FIG. 9.

Generally, the base set point change factor $\Delta_{SPbase}$ should be set such that the nominal scaling factors $S_e$, $S_{\Delta u}$ and $S_{\Delta e}$ are optimal for controlling the process 36 in response to expected load disturbances. Preferably, the base set point change factor $\Delta_{SPbase}$ is set to a value approximately equal to the maximum expected or the average expected error value e resulting from a load disturbance in the process 36, i.e., SP−y. However, the base set point change factor $\Delta_{SPbase}$ can be set to any desired value or determined in any other desired manner and, in a preferred embodiment, has a default setting of one percent of the engineering unit range, i.e., the possible range of the process variable y.

A FLC 46a is responsive to the error signal e, the change in the error signal $\Delta e$, the base set point change factor $\Delta_{SPbase}$, the actual change in the set point signal $\Delta SP$ and the set of nominal scaling factors for controlling the process 36. Specifically, the FLC 46a uses the nominal scaling factors to control the process 36 in response to load disturbances. However, when a change in the set point signal $\Delta_{SP}$ which is greater than the set point change factor $\Delta_{SPbase}$ appears at the FLC 46a, the FLC 46a calculates a set of set point change scaling factors from the nominal scaling factors by multiplying one or more of the nominal scaling factors by a constant. Preferably the nominal error scaling factor $S_e$ is multiplied by 1.167 to get the error scaling factor associated with the set of set point change scaling factors and the nominal change in the control signal scaling factor $S_{\Delta u}$ is multiplied by the factor 0.895 to get the change in the control signal scaling factor associated with the set of set point change scaling factors. The change in the error scaling factor associated with the set of set point change scaling factors is set equal to the nominal change in the error scaling factor $S_{\Delta e}$. These multiplication factors were determined (1) to prevent or reduce overshoot of the process variable y to approximately two percent of the set point value as a percent of the engineering unit range, (2) to minimize the integrated error between the process variable y and the set point SP, and (3) to prevent unnecessary oscillation in the control signal u in response to load disturbances. However, any other desired multiplication factors may be used instead. Alternatively, the FLC 46a may retrieve the set of set point change scaling factors from memory or these scaling factors may be developed by the calculator 56a and delivered to the FLC 46a.

Next, the FLC 46a multiplies all of the set point change scaling factors by the ratio of the actual change in the set point $\Delta_{SP}$ to the base set point change factor $\Delta_{SPbase}$ to develop a modified set of set point change scaling factors. The modified set of set point change scaling factors is then used to control the process 36 in response to the change in the set point. The FLC 46a uses the modified set point change scaling factors for controlling the process 36 until the process variable y reaches a predetermined value, such as a percentage of the set point value, for a predetermined amount of time, and preferably, until the process variable y comes within one percent on either side of the new set point SP for one equivalent integral time $T_i$ of the FLC 46a. However, an operator may choose any other desired values or times.

When the process variable y reaches the predetermined percentage of the new set point SP for the predetermined amount of time, the FLC 46a begins to use the load disturbance scaling factors, i.e., the nominal scaling factors, for controlling the process 36 until, for example, a new set point value is introduced into the system which is greater than the set point change factor $\Delta_{SPbase}$, at which point new modified set point change scaling factors are determined and applied by the FLC 46a, or until the tuner 32 retunes the process 36 to develop new process characteristics.

Based on the above description, a preferable set of calculations performed in the FLC 46a and/or the calculator 56a in determining the scaling factors $S_e$, $S_{\Delta e}$ and $S_{\Delta u}$ for both set point changes and load disturbances for fuzzy PI and fuzzy PID controllers, when the multiplication factor β has been approximated with a constant, are as follows:

FUZZY PI CONTROLLER

Set point change greater than $\Delta_{SPbase}$ $S_{\Delta e}=0.4\Delta_{SP}$ $S_e=S_{\Delta e}T_u/1.2$ $S_{\Delta\Delta u}=0.85S_{\Delta e}K_u$ Load disturbance or set point change less than $\Delta_{SPbase}$ $S_{\Delta e}=0.4\Delta_{SPbase}$ $S_e=S_{\Delta e}T_u/1.4$ $S_{\Delta u}=0.95\ S_{\Delta e}K_u$

FUZZY PID CONTROLLER

Set point change greater than $\Delta_{SPbase}$ $S_{\Delta e}=0.28\Delta_{SP}$ $S_e=S_{\Delta e}T_u/2.0$ $S_{\Delta u}=1.15S_{\Delta e}K_u$ Load disturbance or set point change less than $\Delta_{SPbase}$ $S_{\Delta e}=0.28\Delta_{SPbase}$ $S_e=S_{\Delta e}T_u/2.0$ $S_{\Delta u}=1.15S_{\Delta e}K_u$ wherein:

$T_u$=the ultimate period of the process; and $K_u$=the ultimate gain of the process.

Although the FLCs 46 and 46a have been described as using a tuner which calculates the ultimate period $T_u$ and the ultimate gain $K_u$ of the process 36 in order to develop one or two sets of scaling factors, any other types of tuners which measure any process characteristics can be used, including tuners which use open-loop techniques and other closed-loop techniques. Furthermore, the systems of FIGS. 1, 9 and 11 may determine the scaling factors or other control parameters including the gain, reset and rate of a conventional PID controller using any desired process characteristics. Still further, the tuner 32 may be eliminated and the desired process characteristics may be entered by an operator. An operator may, equivalently, use the desired process characteristics to determine the preliminary control parameters, such as the proportional gain $K_p$ and the integral time constant $T_i$ of the controller, and enter these control parameters into the calculator 56 or 56a and/or the FLC 46 or 46a for use in the above described manner.

Although the control systems of FIGS. 9 and 11 have been described as changing the scaling factors based upon changes in set points and changes in load disturbance values, wherein such scaling factors are used in the fuzzification and defuzzification of the control parameters of a FLC, the membership functions of the FLC could, instead, be modified in an equivalent manner to control the process 36 in the same manner.

Any of the elements appearing in FIGS. 1, 9 and 11, or described herein, may be embodied in hardware, or may be implemented in an appropriately programmed digital computer or processor which is programmed with software, either as separate programs, or as modules of a common program. Furthermore, while the present invention has been described with reference to specific examples, which are intended to be illustrative and not delimiting of the invention, it will be apparent to those of ordinary skill in this art that changes, additions and/or deletions may be made to the disclosed embodiments without departing from the spirit and scope of the invention.

We claim:

1. A non-linear controller for controlling a process in response to load disturbances and a change in a set point, comprising:

means for developing a first set of control parameters for use in response to a load disturbance;

means for determining a change in the set point;

means responsive to the determining means for developing a second set of control parameters for use in response to the set point change, and means coupled to the determining means and to the developing means for controlling the process in accordance with a non-linear control technique using the first set of control parameters in response to a load disturbance and for controlling the process in accordance with a non-linear control technique using the second set of control parameters in response to the change in the set point.

2. The controller of claim 1, wherein the determining means includes means for measuring the magnitude of the set point change and wherein the developing means includes further means for developing one of the second set of control parameters in accordance with the detected magnitude of the change in the set point.

3. The controller of claim 2, wherein the developing means further includes means for deriving the one of the second set of control parameters as a function of a process characteristic.

4. The controller of claim 3, wherein the process characteristic comprises a time delay of the process and a dominant time constant of the process.

5. The controller of claim 3, wherein the process characteristic comprises characteristics necessary to determine an integral time constant and a proportional gain of the controller.

6. The controller of claim 3, further including a tuner which measures the process characteristic.

7. The controller of claim 3, further including means for allowing the process characteristic to be input by an operator.

8. The controller of claim 1, wherein the controlling means comprises a fuzzy logic controller.

9. The controller of claim 8, wherein the one of the second set of control parameters comprises a change in an error scaling factor ($S_{\Delta e}$) and wherein the developing means develops the change in the error scaling factor according to the equation:

$S_{\Delta e}=\beta\Delta_{SP}$ where;

$\Delta_{SP}$=the magnitude of the change in the set point; and

β=a multiplication factor.

10. The controller of claim 9, wherein the multiplication factor β is a function of a time delay of the process and the dominant time constant of a process.

11. The controller of claim 9, wherein the multiplication factor β is a constant.

12. The controller of claim 9, wherein the controlling means includes a fuzzification unit which uses two membership functions to translate a continuous input variable into a fuzzy logic variable.

13. A non-linear controller adapted to control a process in response to a change in a set point, comprising:
   means for measuring the magnitude of the change in the set point;
   means for determining a control parameter from the measured magnitude of the change in the set point and in accordance with a process characteristic associated with the process; and
   means for developing a process control signal from the control parameter using a fuzz logic control technique, wherein the process control signal is adapted for use in controlling the process in response to the change in the set point.

14. The non-linear controller of claim 13, wherein the process characteristic includes a process time delay and a dominant time constant of the process and the determining means determines the control parameter as a function of the process time delay and the dominant time constant of the process.

15. The non-linear controller of claim 13, wherein the determining means determines the control parameter in proportion to the measured magnitude of the change in the set point.

16. The non-linear controller of claim 13, wherein the determining means determines an integral time constant of the controller and a proportional gain of the controller in accordance with the process characteristic and further determines the control parameter as a function of the integral time constant and the proportional gain of the controller.

17. The non-linear controller of claim 13, further including a tuner which measures the process characteristic.

18. The non-linear controller of claim 13, further including means for allowing the process characteristic to be input by an operator.

19. The non-linear controller of claim 18, wherein the allowing means allows the operator to input the process characteristic in terms of an integral time constant and a proportional gain of the controller.

20. The non-linear controller of claim 13, wherein the developing means includes a fuzzification unit which uses two membership functions to translate a continuous variable into a fuzzy logic variable.

21. The non-linear controller of claim 13, wherein the developing means comprises a fuzzy logic controller, wherein the control parameter comprises a set of scaling factors including a change in an error scaling factor ($S_{\Delta e}$) and wherein the determining means determines the change in the error scaling factor ($S_{\Delta e}$) according to the equation $$S_{\Delta e} = \beta \Delta_{SP}$$

where;
   $\Delta_{SP}$ = the magnitude of the change in the set point; and
   $\beta$ = a multiplication factor.

22. The non-linear controller of claim 21, wherein the set of scaling factors further includes a second scaling factor and a third scaling factor and wherein the determining means determines the second scaling factor as a function of the change in the error scaling factor ($S_{\Delta e}$) and an integral time constant of the controller and determines the third scaling factor as function of the change in the error scaling factor ($S_{\Delta e}$) and a proportional gain of the controller.

23. The non-linear controller of claim 21, wherein the multiplication factor $\beta$ is a constant.

24. The non-linear controller of claim 23, wherein the developing means includes a fuzzy logic proportional-integral-derivative (PID) controller and the multiplication factor $\beta$ is approximately 0.28.

25. The non-linear controller of claim 23, wherein the developing means is a fuzzy logic proportional-integral (PI) controller and the multiplication factor $\beta$ is approximately 0.4.

26. The non-linear controller of claim 21, wherein the multiplication factor $\beta$ is a function of the process characteristic.

27. The non-linear controller of claim 26, wherein the process characteristic includes a time delay of the process and a dominant time constant of the process and wherein the multiplication factor $\beta$ is a function of the ratio of the time delay of the process to the dominant time constant of the process.

28. The non-linear controller of claim 27, further including means for detecting the time delay and the dominant time constant of the process.

29. The non-linear controller of claim 13, wherein the developing means comprises a fuzzy logic controller and the control parameter comprises a set of scaling factors and wherein the determining means is responsive to a base set point change factor and includes means for deriving a set of nominal scaling factors in response to the process characteristic and the base set point change factor.

30. The non-linear controller of claim 29, wherein the determining means further includes means for altering one of the nominal scaling factors to develop one of the set of scaling factors.

31. The non-linear controller of claim 30, wherein the altering means multiplies the one of the nominal scaling factors by the ratio of the measured set point change to the base set point change value.

32. The non-linear controller of claim 30, wherein the altering means multiplies the one of the nominal scaling factors by a constant.

33. The non-linear controller of claim 30, wherein the developing means includes further means for developing the process control signal from the nominal set of scaling factors for use in controlling the process in the absence of the change in the set point.

34. The non-linear controller of claim 33, wherein the developing means uses the set of scaling factors to develop the process control signal from a time when a set point change occurs until a time when the process variable remains within a predetermined range of the set point for a predetermined amount of time.

35. A method of controlling a process in response to a change in a set point and in response to a process characteristic, comprising the steps of:
   measuring the magnitude of the change in the set point;
   developing a set of control parameters in response to the process characteristic and the measured magnitude of the change in the set point; and
   controlling the process in accordance with a fuzzy logic control technique using the set of control parameters when the set point change has occurred.

36. The method of claim 35, further including the step of measuring the process characteristic.

37. The method of 36, wherein the step of measuring a process characteristic includes the steps of determining a time delay and a dominant time constant of the process and wherein the step of developing includes the step of developing one of the set of control parameters as a function of the time delay and the dominant time constant of the process.

38. The method of claim 36, wherein the control parameters include a change in an error scaling factor ($S_{\Delta e}$), and wherein the step of developing includes the step of developing the change in the error scaling factor according to the equation:

$$S_{\Delta e} = \beta \Delta_{SP}$$

where;

$\Delta_{SP}$=the magnitude of the change in the set point; and
$\beta$=a multiplication factor.

39. The method of claim 38, wherein the multiplication factor $\beta$ is a constant.

40. The method of claim 38, wherein the multiplication factor $\beta$ is a function of a time delay of the process and a dominant time constant of the process.

41. The method of claim 36, further including the steps of determining a further set of control parameters and controlling the process in response to the further set of control parameters in response to a load disturbance in the process.

* * * * *